(12) United States Patent
Beyers

(10) Patent No.: US 6,497,195 B1
(45) Date of Patent: Dec. 24, 2002

(54) HAY FEEDING CASE

(76) Inventor: Edward O. Beyers, 928 St. Paul Rd., Ballwin, MO (US) 63021

( * ) Notice: Subject to any disclaimer, the term of this patent is extended or adjusted under 35 U.S.C. 154(b) by 0 days.

(21) Appl. No.: 09/592,102

(22) Filed: Jun. 12, 2000

Related U.S. Application Data

(60) Provisional application No. 60/139,093, filed on Jun. 14, 1999.

(51) Int. Cl.[7] .................................................. A01K 1/10
(52) U.S. Cl. .......................................... 119/60; 119/65
(58) Field of Search .............................. 119/60, 65, 66, 119/67, 68, 69, 51.01; 220/4.22, 480; 229/120, 120.1

(56) References Cited

U.S. PATENT DOCUMENTS

| | | | |
|---|---|---|---|
| 36,905 A | | 11/1862 | Hawkins |
| 185,238 A | * | 12/1876 | Johnson ........................ 119/61 |
| 663,081 A | * | 12/1900 | Jarvis ........................... 119/65 |
| 933,216 A | * | 9/1909 | Wilson ......................... 119/65 |
| 1,216,203 A | * | 2/1917 | Bower .......................... 119/60 |
| 1,553,834 A | * | 9/1925 | Peterson ....................... 119/60 |
| 1,818,908 A | * | 8/1931 | Pouchain et al. ........... 206/773 |
| D85,404 S | * | 10/1931 | Townley ...................... 119/459 |
| 2,500,889 A | | 3/1950 | Winkler |
| 2,775,387 A | * | 12/1956 | Bester .................... 220/560.15 |
| 3,522,904 A | * | 8/1970 | Locke et al. ................ 119/497 |
| 3,863,829 A | * | 2/1975 | Merrill ........................ 206/423 |
| 3,941,092 A | * | 3/1976 | Winters ....................... 119/497 |
| 3,949,931 A | * | 4/1976 | Hall ............................ 206/807 |
| 4,010,888 A | * | 3/1977 | Gilbert ......................... 119/454 |
| 4,020,794 A | | 5/1977 | Nethery |
| 4,201,330 A | * | 5/1980 | Gilbert .................. 229/117.16 |
| D262,746 S | | 1/1982 | Harris |
| 4,488,510 A | | 12/1984 | Lundgren et al. |
| 4,976,222 A | | 12/1990 | Cooke |
| 5,000,122 A | * | 3/1991 | Smith ........................... 119/58 |
| 5,181,651 A | * | 1/1993 | Oppenheim ................. 229/120 |
| 5,189,985 A | * | 3/1993 | Brady et al. ............. 119/51.03 |
| 5,381,759 A | | 1/1995 | Thorne |
| D368,556 S | * | 4/1996 | Rodgers .................... D30/106 |
| 5,509,377 A | * | 4/1996 | Franklin ....................... 119/60 |
| 5,690,275 A | * | 11/1997 | Bose et al. .................. 220/676 |

FOREIGN PATENT DOCUMENTS

| | | | |
|---|---|---|---|
| DE | 3323394 A1 | * | 3/1985 |
| GB | 2071985 A | * | 9/1981 |

\* cited by examiner

*Primary Examiner*—Yvonne R. Abbott
(74) *Attorney, Agent, or Firm*—Paul M. Denk

(57) ABSTRACT

A plastic or other polymer case, similar to a suitcase, and which is hinged at its bottom, even by way of a living hinge, the plastic case is formed of two segments, like a suitcase, having a series of apertures therein, for sighting of any hay provided therein, and which includes various slots, at the front, or perhaps even at the back, to allow access of the horse to feed when the case is filled with hay and hung within a stable, stall, or in a trailer, where the horse is kept.

10 Claims, 2 Drawing Sheets

HAY FEEDING CASE

CROSS-REFERENCE TO RELATED APPLICATION

This application is a non-provisional patent application based upon provisional patent application having Ser. No. 60/139,093, filed on Jun. 14, 1999, which is owned by the same inventor.

STATEMENT REGARDING FEDERALLY SPONSORED RESEARCH OR DEVELOPMENT

Not applicable.

BACKGROUND OF THE INVENTION

Various styles of feeding mechanisms have been long available for dispensing food to pets, animals, and the like. For example, hay bins, for feeding animals, such as horses, cows, and the like, have long been used by the farmer.

Various prior art patents, albeit old in age, have shown various types of feed racks, such as the patent to Hawkins, U.S. Pat. No. 36,905, which is used for holding feed, for sheep, and which is fabricated of various hinged components, as can be noted in the patent. Various types of hooks are located to one side of the rack, and appears to have hinges at its opposite side, such that when the rack is closed, it can be filled with feed, for feeding of sheep. Obviously, it can also be opened, apparently for cleaning purposes.

The patent to Winkler, U.S. Pat. No. 2,500,889, shows a portable livestock feeder. This particular feeder just shows a variety of space bars, that allow animals to attain entrance, at least apparently the head part of the animal, in order for the livestock to feed.

The patent to Nethery, U.S. Pat. No. 4,020,794, shows a portable animal feeding station. This station is simply provided upon skids, has a wire siding, that allows the animals to attain access to the hay or other feed enclosed therein.

The design patent U.S. Pat. No. Des. 262,746, to Harris, shows another animal feeder, and it appears, at least in its FIG. 4, that this feeder may be fabricated of two parts, and has a sloping bottom, which apparently allows concentration of the animal feed, at the location where it is consumed.

The patent to Lundgren, Sr., U.S. Pat. No. 4,488,510, shows another form of hay feeder. This is apparently just a feed bag type of device that has a series of ribs to provide access therethrough, so the animal can either obtain access to the feed through the slits, or through the top opening.

The patent to Cooke, U.S. Pat. No. 4,976,222, shows a horse feeder which includes an apparently molded barrel type of design, with a grill provided across its access opening.

Finally, the patent to Thome, U.S. Pat. No. 5,381,759, shows another feeding device for stock. This device appears to be far more complex a design than the current invention, and includes a trough, with a bin furnishing an access opening therethrough, and series of upright bars above the bin.

SUMMARY OF THE INVENTION

This invention relates principally to the hay box, which has been devised as a hay feeding case, and which can be opened, like a suitcase, to have hay added thereto, closed, hung into position, to allow convenient and portable feeding of horses, and the like, with a minimum of effort.

The invention contemplates the formation of a hay feeding case that will conveniently allow the owner of horses to easily feed them, under a variety of conditions or locations, as necessary. Apparently among horse fanciers, particularly those that have horses that are transported around in trailers, from show to show, there is a feed bag that is used to allow the horses to feed, during transit, or even when in a stall. Currently, such a bag is made out of mesh rope or twine, the hay is simply put in it in bulk, the bag is hung on a wall, and the horses can pull the hay out of the netting, for consumption. Sometimes, the horses get their foot or leg stuck in the netting, and then the feed bag has to be cut away, to release the horse, or it can lead towards fracture or injury to the horse's legs with predictable results. This invention can be placed low to the ground without the worry of the horse getting its foot or leg caught in it.

This current invention contemplates the fabrication of an inexpensive plastic box, similar to a suitcase, which is hinged, by way of a living or other hinge, at the bottom, wherein the hay can be located therein. The plastic box is closed, and a cord is provided at the top looped through a pair of handles, for holding the box in closure. The same cord can be used to hang the container onto the wall of the trailer, stall, or the like, to readily be available for feeding of the horse, at any time. The plastic box is formed slanted at its bottom, so that the hay will fall towards the bottom center, at the location of the hinge, and allow the horse to feed even upon the various grains that accumulate thereat, not only to provide feed to the end, but also that part of the feed which may be most nutritious.

It is, therefore, the principal object of this invention to provide for a portable hay feeding case that can be used by horseman to instantly feed the horses, at any time and moment.

Another object of this invention is to provide for a very facile case that can be easily opened, portions of a hay bale, or flakes of hay, can be peeled away and added into the case, for instant feeding.

Another object of this invention is to provide a hay feeding case which, because of its various closure means, can be looped by means of a rope or cable into closure, with the same roping used to hang the case from the wall of the trailer, stall, or the like, readily available for consumption by the horse.

These and other objects may become more apparent to those skilled in the art upon reviewing the summary herein, and upon undertaking a study of the description of its preferred embodiment, in view of the drawings.

DESCRIPTION OF THE PREFERRED EMBODIMENT

Figure 1:
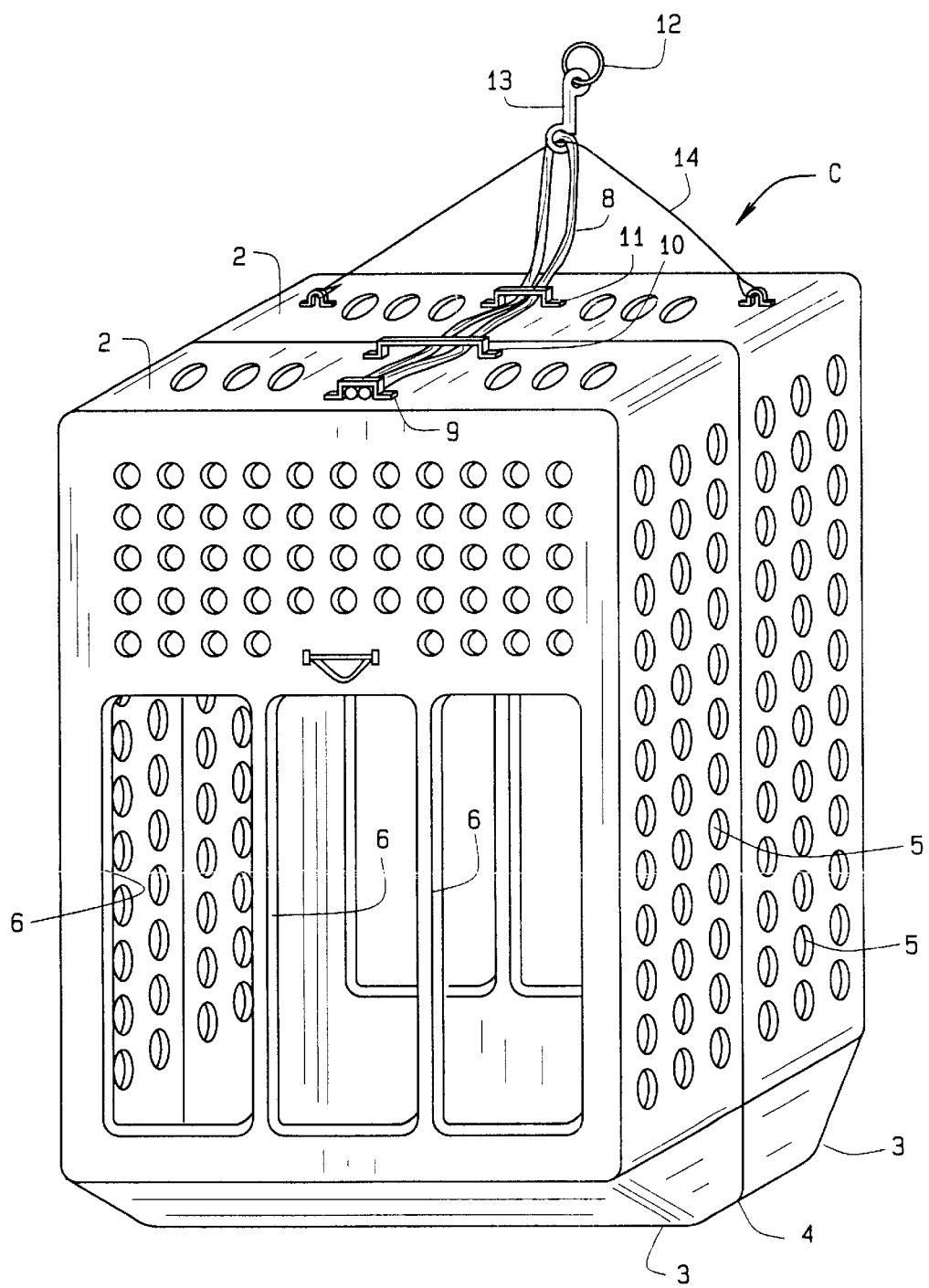
FIG. 1 is an isometric view of the hay feeding case of this invention.
Figure 2:
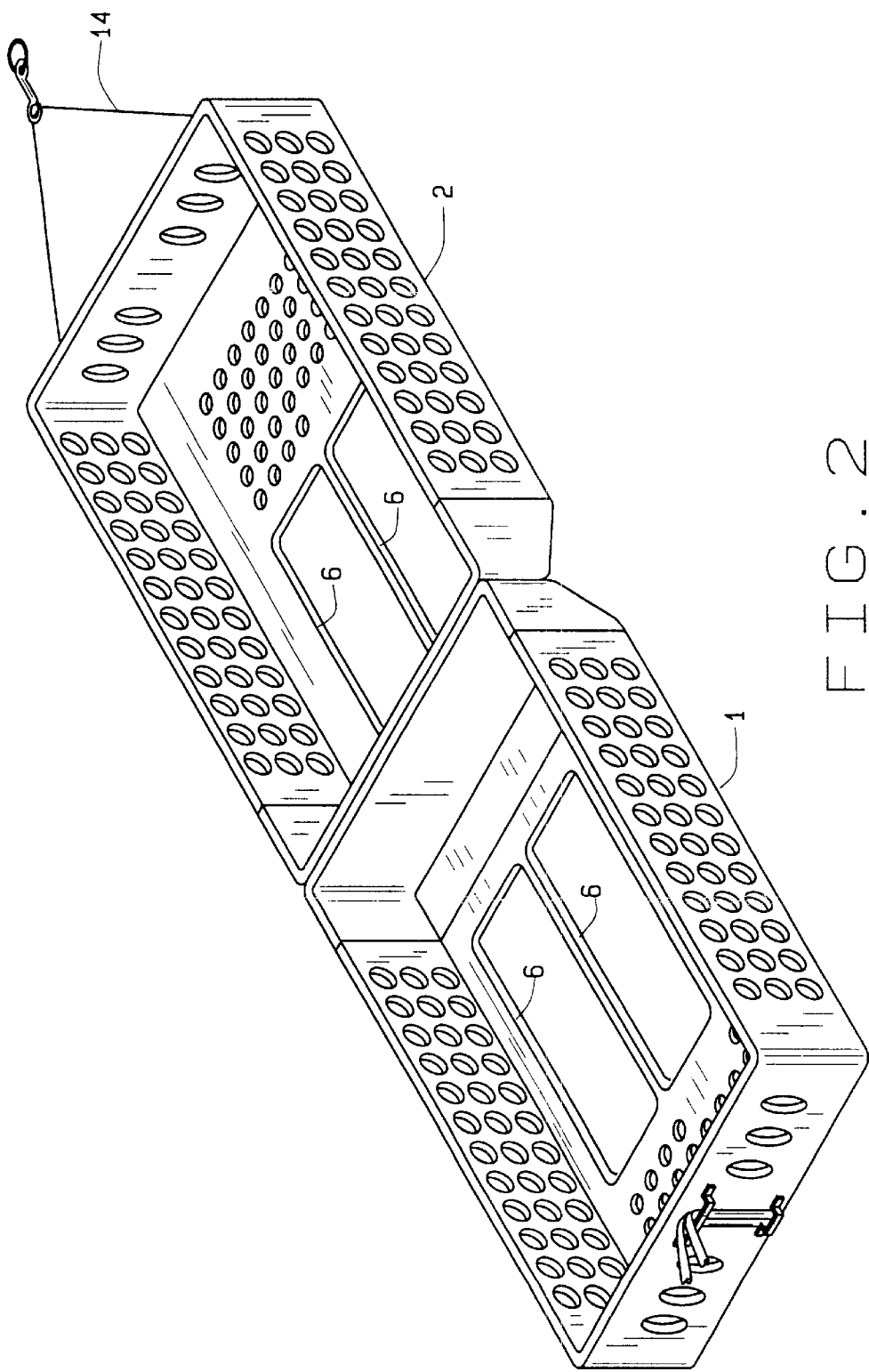
FIG. 2 discloses the same case when opened.

In referring to FIGS. 1 and 2 of the drawings, they disclose the hay feeding case C of this invention, which includes a two-part box, as at 1 and 2, that have a sloping bottom, as at 3, held together by means of a hinge 4, which may comprise any type of a hinge, or a living hinge, which may be formed during injection molding of the plastic box when formed.

The polymer box has a series of apertures, as at 5, provided at both its front and sides, so that any hay applied therein can be readily seen. Then, at the front bottom of the case, there are a series of large openings, as at 6. It is through these openings that the horse may attain access to the hay, for consumption. As can be noted, these openings may be approximately six inches in width, individually. As can further be noted, these openings are provided at both the front and back of the case, to allow its usage and suspension to either side, when employed.

As can be noted, when the case is opened, as can be seen in FIG. 2, it provides an interior spacing, within both sides or halves of the two-part case, so that flakes of hay may be applied therein, as can be understood by the skilled horseman. For example, a bale of hay is formed of various flakes, they are approximately 12" to 15" deep, approximately 16" to 20" wide, and 3" thick. This case can hold at least three of these flakes, on top and 3 flakes on bottom, adjacent each other, applied into the case, when it is opened, and then when the case is closed, readily disposes hay for consumption through both the front and back openings 6, as can be readily understood.

At the upper section of the case, there is an eyelet 7, and through which a cord 8 is retained, as by way of a knot 9. The cord then extends through the various handles 10 and 11, and then extends upwardly for securement to a metal clip, as at 12, by means of a removable fastener, or other hook 13. Then, this metal clip may be applied either to the wall of the trailer, or the stall, and can be used for suspending the case, laden with its flakes of hay, thereat, for consumption by the horse, or other animal. A supplemental cord 14 may also be attached to the upper end of the case, for facilitating the suspension of the case to the wall, in preparation for usage. The case may be opened and filled while hanging on a wall.

The benefit of this portable case is that it can be hung at any height, in order to accommodate the size of the horse being serviced.

The convenience of this invention is that this hay case can be hung close to the ground, and the owner does not have to worry about his/her horse putting a foot into the hay box, because it is closed at the top, and therefore, it cannot cause a laming of the horse in that manner. The case can be formed as a one-piece molded plastic construction, having the solid bendable plastic living hinge at the bottom, it has a solid bottom, so it can hold even alfalfa leaf type of feed, as required. This device, when used, can replace the various styles of hay bags, as have long been used in the art, but sometimes with disastrous results. In addition, the size of this case can be to various dimensions, and even the feed slots or holes at the front and back, could be made even wider, upon widening of the case.

Variations or modification to the structure of this invention may occur to those skilled in the art upon reviewing the disclosure herein. Such modifications, if within the spirit of this development, are intended to be encompassed within the scope of this invention. The description of the preferred embodiment, and the illustrations set forth in the drawings, are provided for illustrative purpose only.

Having thus described the invention, what is claimed and desired to be secured by Letters Patents is:

1. An animal feeding case including a two-part box, the two-part box being formed of two compartments, said compartments comprising front and back compartments, each compartment having a pair of side walls, top wall, bottom wall, and a main wall, integrally connecting all of the previous walls together, each bottom wall having a lateral edge, and said lateral edge of each bottom wall of the two compartments being maintained in continuity and being connected together to provide for pivotal movement of the compartments about their lateral edges, the main wall of the front compartment having a series of slots provided therethrough, each of said slots extending from approximately the bottom wall to a height approximately in excess of one half the height of the main wall, said series of slots allowing for access for feeding of feed disposed within the said case.

2. The animal feeding case of claim 1 and wherein said fastening of the lateral edges of the front and back compartments together include a hinge.

3. The animal feeding case of claim 2 and wherein said case is formed of polymer and said hinge is a living hinge.

4. The animal feeding case of claim 1 and wherein said bottom walls of each front and back compartment sloping downwardly towards their lateral edges.

5. The animal feeding case of claim 4 and including a handle provided upon each of the top walls of the front and back compartments of said case, to accommodate conveyance of the case during usage.

6. The animal feeding case of claim 1 and wherein said front and back compartments further include a series of holes provided therethrough to provide for aeration and drying of any animal feed located therein during usage.

7. The animal feeding case of claim 1 wherein said front and back compartments are each constructed of a molded polymer.

8. An Animal feeding case including a two-part box, the two-part box being formed of two compartments, said compartments comprising front and back compartments, each compartment having a pair of side walls, top wall, bottom wall, and a main wall, integrally connecting all of the previous walls together, each bottom wall having a lateral edge, and said lateral edge of each bottom wall of the two compartment being maintained in continuity and being connected together to provide for pivotal movement of the compartments about their lateral edges, the main wall of the front compartment having a series of slots provided therethrough to allow for access of any animal for feeding of the feed disposed within the said case, the bottom walls of each front and back compartments sloping downwardly towards their lateral edges, a handle provided upon each of the top walls of the front and back compartments of said case, to accommodate conveyance of the case during usage, and cord means, affixed to the approximate top wall of the front compartment, and extending through each of said handles, and for affixing to a supporting surface, during usage, to thereby hold the front and back compartments into closure and suspend the case during usage.

9. The animal feeding case of claim 8 and wherein said slots through said front wall of the front compartment extend approximately from the mid point of its front wall down to its approximate bottom wall.

10. The animal feeding case of claim 9 and wherein said back wall includes a series of slots provided therethrough to accommodate the feeding of any animal therethrough.

* * * * *